June 12, 1956  G. I. HOLMES  2,750,539
ELECTROMAGNETIC CONTROL DEVICE
Filed Aug. 18, 1952  3 Sheets-Sheet 1
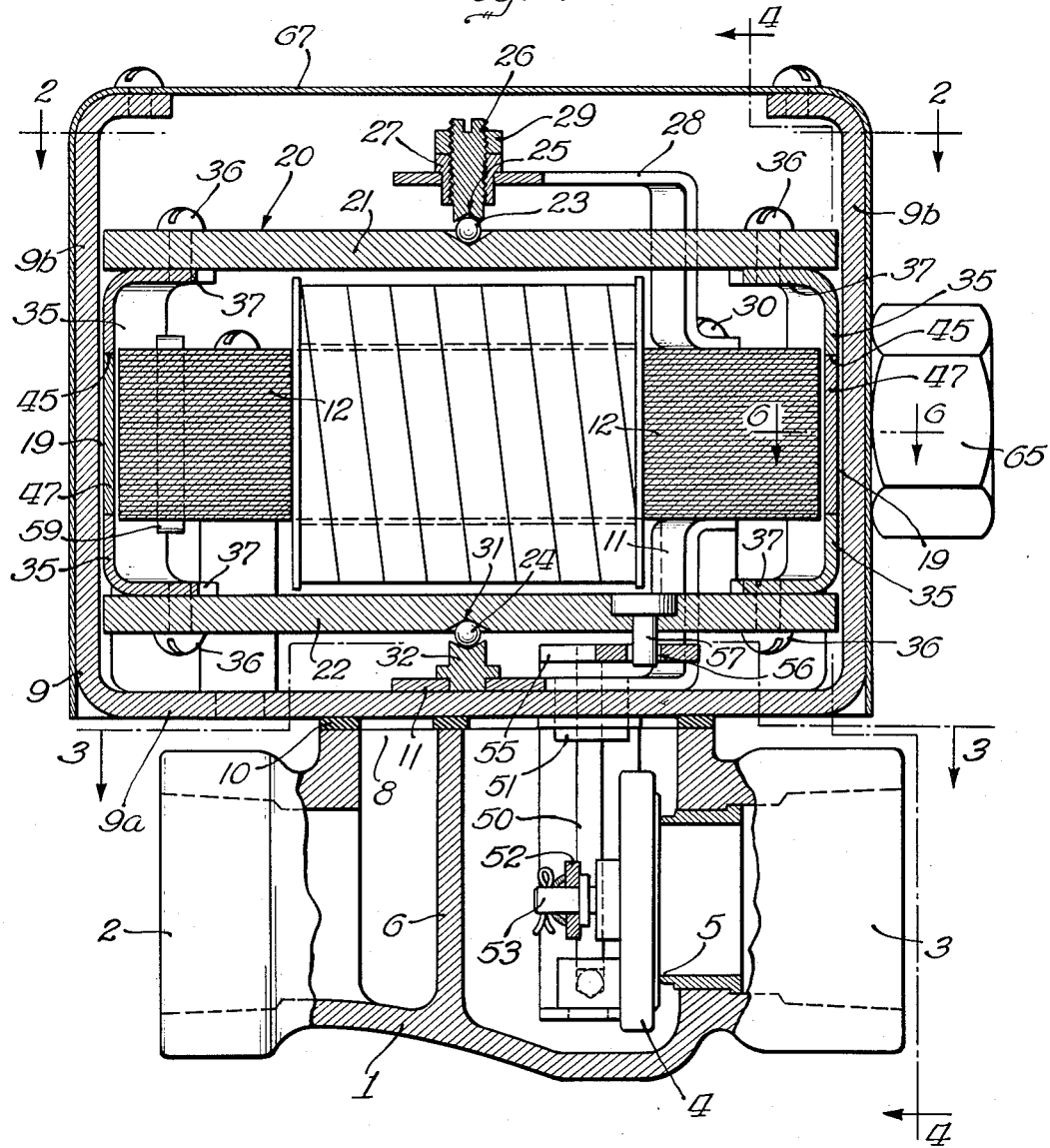
INVENTOR.
Gifford I. Holmes
BY
Attys.

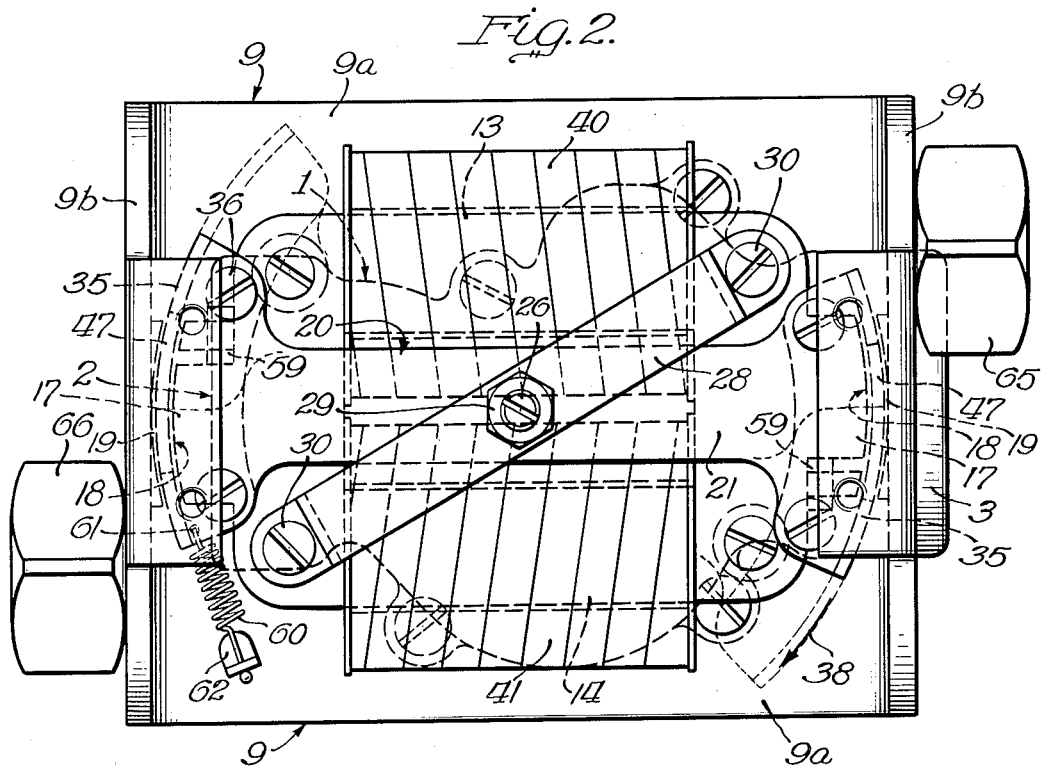
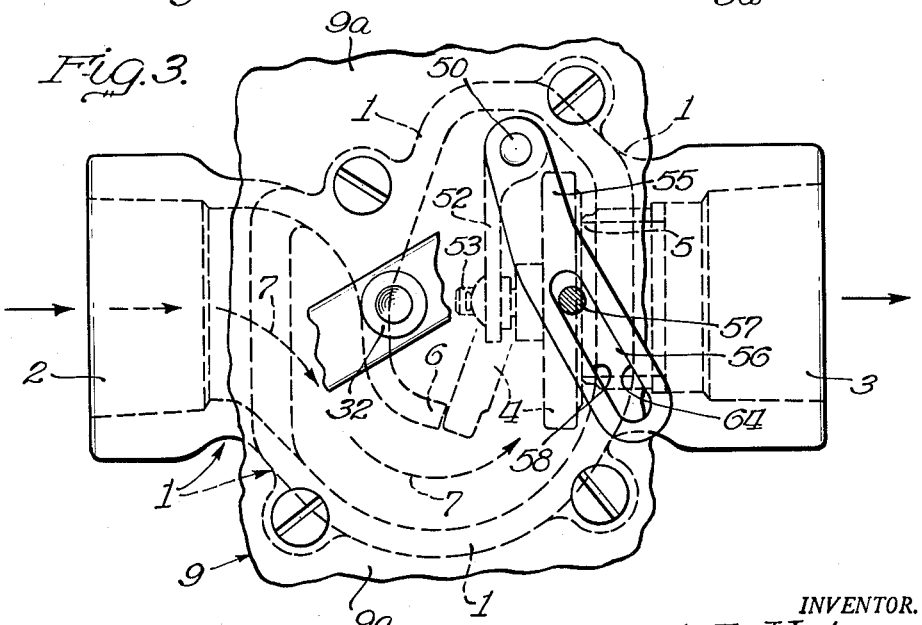

June 12, 1956  G. I. HOLMES  2,750,539
ELECTROMAGNETIC CONTROL DEVICE
Filed Aug. 18, 1952  3 Sheets-Sheet 3

INVENTOR.
Gifford I. Holmes
BY
Brown, Jackson, Boettcher & Dienner
Attys.

United States Patent Office 2,750,539
Patented June 12, 1956

2,750,539

ELECTROMAGNETIC CONTROL DEVICE

Gifford I. Holmes, Orion, Ill., assignor to Milwaukee Gas Specialty Company, Milwaukee, Wis., a corporation of Wisconsin Application August 18, 1952, Serial No. 305,009

16 Claims. (Cl. 317—168)

This invention relates, in general, to control devices, and more particularly to electromagnetic operators having particular utility in the operation of valves or the like of novel construction for controlling the flow of fluids therethrough.

While I have shown and shall describe herein the electromagnetic operator of the present invention as applied for operating a valve, it is to be understood that it is not in its broader aspects limited to such use but may be employed for all similar purposes, for example, for operating a switch or the like or other desired device.

In the provision of apparatus of the character to which the present invention relates, certain basic considerations must be kept in mind. First, where, for example, the apparatus is for controlling the flow of fluid fuel to a main burner of fluid fuel burning apparatus, the valve must have sufficient capacity to be usable for this purpose. The capacity of a valve, it has been found, is for all practical purposes a function of the product of size or diameter of the valve and the distance which the valve member is removed from the valve seat when the valve is opened, such movement usually being against the sealing force of the valve member which, in turn, must be sufficient to prevent leakage of the valve when closed. It follows, therefore, that a given amount of work must be done to open a valve of given capacity and that the amount of force provided by the operator must be sufficient to do such work.

Accordingly, one of the main objects of the present invention is to provide an improved form of electromagnetic operator which will provide a powerful force suitable for operating, for example, a valve for controlling the flow of fuel to a main burner even where the size or diameter of the valve is relatively large and the distance which the valve is removed from the valve seat when the valve is opened is relatively great. The powerful force that may be provided by the electromagnetic operator of the present invention is also capable of moving such a valve against a sealing force sufficient to prevent leakage of the valve when closed.

Another object is to provide a compact and highly efficient operator that lends itself to economical fabrication, is silent in operation, and has high torque or operating force at the start of the stroke or operator movement as distinguished from devices in which the force exerted initially is a minimum. This is advantageous in that it provides a large initial or starting force for overcoming the inertia and friction of the moving parts and a strong initial force which, for example, will overcome fluid pressures in "cracking" or opening a valve wherein the controlled fluid, such as gas for a gas heater, usually tends to hold the valve closed.

Another object is to provide an improved form of electromagnetic operator wherein the one or more magnetic air gaps are never completely closed, and which air gap remains constant throughout the life of the device as distinguished from electromagnetic devices wherein a magnetic part is attracted to and sealed against an electromagnet when energized or in which non-magnetic spacers are utilized in an attempt to maintain an air gap. The present device thereby eliminates any sticking or "hang up" of the attracted member and substantially eliminates any differential in the "pick up" and "drop out" of the device as, for example, due to residual magnetism. The electromagnetic operator of the present invention is not only powerful but has great sensitivity and quick response.

Another object is to provide an improved form of electromagnetic operator having a first magnetic frame provided with at least one and preferably a pair of pole faces directed externally in opposite directions, a second magnetic frame having at least one and preferably a pair of portions spaced externally from the pole faces to form air gaps therebetween, a winding on the first magnetic frame which when energized is adapted to produce magnetic flux in said frame and across the one or more air gaps, an armature comprising a portion mounted for turning movement about an axis and extending generally transversely with respect to the axis of turning movement and out beyond the outer periphery of the first magnetic frame to provide a relatively long torque arm, and at least one and preferably a pair of longitudinally extending armature arms at the outer ends of such torque arm operable in the air gaps and externally of the pole faces to impart turning movement to the armature by magnetic flux produced across the air gaps by energization of the winding.

Another object is to provide means connected to the generally transversely extending armature portion or torque arm between the axis of turning movement and the outer end of this arm for transmitting turning movement imparted to the armature to the valve or other actuated member to actuate same from one position to another position.

Another object is to provide an armature having a pair of armature portions or torque arms mounted for turning movement about an axis and between which is located the magnetic frame on which the energizing winding is disposed.

Another object is to provide biasing means for biasing the armature in a direction opposite to the direction in which it is moved by magnetic flux across the air gap and which biasing means is effective when no flux is present in the air gap to move the actuated member to one of its positions and to position the armature where it will be acted upon by magnetic flux across the air gap to move the actuated member to its other position.

Another object is to provide an armature of the aforementioned character in which the armature arms have current conducting paths of closed circuit looped form through which current induced by the supply of electric energy to the winding is adapted to flow for reaction with the magnetic flux across the air gaps to impart the desired turning movement to the armature, and in which, where desired, magnetic inserts may be located within the looped conducting paths and within the air gaps to increase the power provided by the operator.

Further objects and advantages and numerous adaptations of the invention will appear from the following detailed description taken in connection with the accompanying drawings, it being understood that the invention is limited only within the scope of the appended claims and not to the particular embodiment selected for illustration.

In the drawings:

Figure 1 is an axial sectional view of one form of device embodying the present invention;

Figure 2 is a sectional view taken on the line 2—2 of Figure 1;

Figure 3 is a view taken on the line 3—3 of Figure 1;

Figure 4 is a sectional view partially in elevation taken on the line 4—4 of Figure 1;

Figure 5 is a plan view on somewhat reduced scale of the magnetic frame on which the energizing winding is disposed, and showing a secondary winding and schematically thermostatic means for controlling the secondary circuit; and Figure 6 is a detail section through one of the armature arms on the line 6—6 of Figure 1 showing in full lines the position of the armature arm when no flux is present in the air gaps.

Referring now to the drawings, the embodiment of the invention therein illustrated comprises a valve body 1 having a fluid inlet 2 and a fluid outlet 3. A valve member 4 cooperates with a valve seat 5 at the outlet 3 to control the flow of fluid through the valve, for example, the flow of gaseous fuel to a burner (not shown) or any other fluid. It will be noted that the controlled fluid tends to hold the valve member 4 closed. This may, of course, vary within the scope of the present invention.

If desired, the valve body 1 may have a wall 6 rounded and extending between the inlet 2 and outlet 3 to direct the flow of fluid to the outlet along a curved path shown by dotted lines 7 in Figure 2. In this way, the controlled fluid is directed around the valve member 4 when in its open position as shown in dotted lines in Figure 2 and the force of the fluid against the valve member 4 in closing direction is lessened.

The valve body 1 has an opening 8 covered by an enclosure 9 for electromagnetic operator means to be hereinafter described. The bottom wall 9a of enclosure 9 affords a plate-like cover for opening 8 and may be secured in place, for example, by screws (not shown) screwed into the valve body 1. Sealing means 10 is preferably interposed between the plate 9a and valve body 1 to render the connection gastight. The upper side of base plate 9a is provided with a pair of integrally formed arms 9b of configuration best shown in Figures 1 and 2. The base plate 9a and arms 9b are preferably formed of iron or other magnetic material and form a magnetic flux path as will presently appear.

Mounted on base plate 9a, for example, by a bracket 11 having upstanding arms at its opposite ends is a power unit comprising a core or magnetic frame 12 of laminated or other suitable form supported on the bracket arms. The particular magnetic frame 12 selected for illustration is of generally rectangular configuration comprising a pair of parallel side legs 13 and 14 magnetically connected by parallel end legs 15 and 16. The frame 12 is arranged in position endwise between the arms 9b. Each end leg is provided with an integrally formed pole piece 17 which pole pieces have pole faces 18 which may be of arcuate form as shown in Figure 5. These pole faces 18 are directed externally in opposite directions toward the arms 9b and are spaced from arms 9b to form air gaps 19 therebetween one of which is shown in detail in Figure 6.

The armature 20 comprises space armature portions or relatively long torque arms 21 and 22 between which the magnetic frame 12 is disposed. The arms 21 and 22 are mounted for turning movement about an axis between their opposite ends which axis is formed, for example, by ball bearings 23 and 24. The bearing 23 is held in a depression 25 in the arm 21 and between the arm 21 and the depressed inner end of a screw 26 screwed through a sleeve 27 carried by a bracket 28 and locked in place by a nut 29. The bracket 28 may be supported, for example, by attachment at opposite ends to magnetic frame 12 by screws 30. The other bearing 24 is held in a depression 31 in the arm 22 and between arm 22 and the depressed inner end of a bearing seating member 32 which may be secured in place in the bracket 11 as shown in Figure 1. The torque arms 21 and 22 are preferably formed of aluminum or other suitable non-magnetic material.

The armature arms 21 and 22 extend generally transversely with respect to the axis of turning movement of the armature 20 and out beyond the outer periphery of the magnetic frame 13 and beyond the external pole faces 18 to form relatively long torque arms. Each of the opposite ends of the arms 21 and 22 is provided with a longitudinally extending armature arm 35. The arms 35 are preferably formed of copper or other non-magnetic and good electrical conducting material and may be secured to the arms 21 and 22, for example, by screws 36 which pass through the arms 21 and 22 and are screwed into the angular ends 37 of the arms 35 which fit between the arms 21 and 22. The armature arms 35 operate in the air gaps 19 as shown in Figure 5 to impart turning movement to the armature 20 in the direction of the arrow 38 (Figure 2) by magnetic flux produced across the air gaps 19 upon energization of the device as will presently appear.

The power unit further comprises a primary winding 40 and a secondary winding 41. The primary winding 40 is adapted to be connected to a suitable source of electrical energy as depicted by the symbol 42 in Figure 5. The circuit of the secondary winding 41 may include condition responsive means such as a thermostat illustrated schematically at 43 in Figure 5. It will be understood that when the primary winding 40 is energized, and the secondary circuit open, the magnetic flux created in the magnetic frame 12 will tend to flow around the frame through the leg 14 upon which the secondary winding 41 is mounted in preference to jumping the air gaps 19 between pole faces 18 and magnetic arms 9b. However, when the secondary circuit is closed, induced currents in the secondary winding 41 will divert the magnetic flux from the leg 14 and across the aforementioned air gaps to cause movement of the armature about its axis as will hereinafter be described.

Each armature arm 35 is preferably provided with an opening or window 45 forming a current conducting path of closed looped form about each such window 45 as shown by the arrows at 46 in Figure 4. Current induced by the magnetic flux produced across the air gaps 19 is adapted to flow through these closed looped conducting paths 46 for reaction with the magnetic flux across the air gaps to impart turning movement to the armature 20 about its axis in the direction of the arrow 38 in Figure 2. If desired, inserts 47 of iron or other magnetic material may be located in the windows or openings 45 and thereby within the looped conducting paths 46 and in the air gaps 19 between pole faces 18 and magnetic frame members 9b to increase the power provided by the operator.

A shaft 50 is mounted for turning movement, for example, in a sleeve 51 carried by the base plate 9a. An actuating arm 52 connected to the shaft 50 for swinging movement with turning of the shaft 50 about its axis is connected, for example, by a pin 53 to the valve member 4 to swing the valve member 4 to open position away from its seat 5 and to closed position engaging the seat 5 by turning movement imparted to the shaft 50. One suitable form of valve disc and connection between it and an actuating shaft is illustrated and described more fully in the copending application of Floyd J. Bydalek, Serial No. 194,511, filed November 7, 1951, now Patent No. 2,687,274.

A cam arm 55 is fixed on the upper end of the shaft 50 to impart turning movement to the shaft upon swinging movement of the arm 55. The arm 55 has a cam slot therein as shown at 56 in Figure 3. A pin 57 carried by the torque arm 22 extends into the slot 56. With the valve member 4 closed against its seat 5 and the parts in the positions shown in Figure 2 when there is magnetic flux across the air gaps 19, the armature 20 is swung in the direction indicated by the arrow 38 in Figure 2 and the pin 57 engages the surface 58 (Figure 3) of the slot 56 and by a downhill cam action forces the arm 55 in a clockwise direction (Figure 3) about the axis of the shaft 50.

This turns with a powerful force the shaft 50 in a direction which swings the valve member 4 to open position. Shading rings may be provided as illustrated at 59 in Figure 5.

A biasing spring 60 is connected, for example, at one end at 61 to the torque arm 22 and at its opposite end to a bracket 62 fixed to the base plate 9a and biases the armature in a counterclockwise direction as the device is shown in Figure 2. The biasing spring 60 is effective when no magnetic flux is present in the air gaps 19 to move the valve member 4 to closed position against its seat 5 and to hold the valve member 4 against seat 5 with sufficient sealing force to prevent leakage of the valve when closed. At the same time (i. e., when no magnetic flux is present in the air gaps 19) the biasing spring 60 moves the armature arms 35 to position in the air gaps 19 where they will be acted upon by magnetic flux to impart by repulsion turning movement to the armature in the direction for opening the valve member 4. This latter positioning of one of the arms 35 is shown more or less schematically in full lines in Figure 6. This latter positioning of the armature arms and closing of the valve is accomplished by engagement of the pin 57 carried by the torque arm 22 with a cam action against the surface 64 of the cam slot 56.

The enclosure 9 may be provided with conduit connections 65 and 66 for connecting the primary and secondary windings 40 and 41 in circuit with their respective primary and secondary circuit conductors. The enclosure 9 preferably includes a cover 67 of non-magnetic material and of suitable form.

The mode of operation of the aforedescribed device is as follows:

Assuming the primary coil 40 to be energized, as it will be under ordinary circumstances, since the device inherently has a very low stand-by power loss, a magnetic flux will be created in the magnetic frame 12 in a clockwise direction as shown in Figure 5, the flux as aforementioned flowing through the leg 14 of the magnetic frame 12 as long as the circuit of secondary winding 41 remains open. The armature 20 is angularly disposed so that in unenergized condition the looped conducting paths 46 of the armature arms 35 are off center with respect to the pole faces 18 with one side of each looped conducting path 46, for example, slightly out of the air gaps 19 in the direction in which turning movement is to be imparted by the presence of magnetic flux in the air gaps. It is, of course, understood that the angular disposition of the armature when the device is unenergized is determined by the bias afforded, for example, by the spring 60. In the illustrated embodiment of the invention, the seating of valve member 4 against the valve seat 5 under the bias of spring 60 limits rotation of the armature and provides a stop therefor in its unenergized state.

When the circuit of secondary winding 41 is closed, as for example by closure of the contacts of the thermostat 43, the magnetic flux of the magnetic frame 12 will no longer flow through leg 14 thereof, but will be diverted to the pole pieces 17 and will flow across the air gaps 19 and through the magnetic frame including the base plate 9a and arms 9b. Electric current induced in the armature arms 35 by the magnetic flux flows through the closed circuit looped paths 46 for reaction with the magnetic flux across the air gaps which reaction moves by repulsion the armature arms 35 from the air gaps 19, for example, to the position shown in dotted lines in Figure 2, with accompanying turning movement of the armature in the direction of the arrow 38 in Figure 2.

It is, of course, understood that rotation of the armature and consequent movement of the valve member 4, for example, to open position through the linkage of pin 57 and cam arm 55 is against the bias of the spring 60 which returns both the valve member 4 and the armature to their initial position upon deenergization of the device as, for example, by reopening or separation of the contacts at the thermostat 43.

In this connection, it may be observed that the spring rate of the biasing means may, if desired, be matched to the torque characteristics of the armature to enhance its desired characteristics.

The power requirement of the aforedescribed operator is less than that of a conventional solenoid operator capable of actuating a valve or other actuated device of the same size and therefore the device is inherently more efficient than conventional solenoid operators.

Upon cessation of magnetic flux across air gaps 19, the armature 20 is returned by the biasing spring promptly and without danger of sticking to the position from which it is moved by repulsion when magnetic flux is present in the air gaps with accompanying movement of valve 4 to closed position. The device is not subject to residual magnetism and the initial operating force obtained by repulsion of armature 20 by magnetic flux across the air gaps 19 is at a maximum at the beginning of the operator movement.

Another desirable feature of the device of the present application is that the magnetic frame 12 and windings 40 and 41 for establishing and diverting the magnetic flux across the air gaps 19 constitute a current limiting step-down transformer wherein the electric energy produced in secondary winding 41 may be relatively low and substantially constant so that the secondary circuit and thermostat or other condition responsive means will not be deleteriously affected by the energizing current supplied to the primary winding and so that the type of insulating conduits required for line voltage conductors are unnecessary. The device is also immune to short circuits on the secondary side of the transformer from the standpoint of damage due to overheating and it is immune to the influence of gravity and, therefore, may be used in any desired position.

While a secondary winding and associated magnetic frame leg have been shown, it is to be understood that the secondary winding and the related leg of the magnetic frame may be omitted within the scope of the present invention. This will provide a line voltage device which is rendered operable by energization of the primary winding when the primary circuit is closed and a device which is deenergized by opening the circuit for the primary winding.

The embodiment of the invention shown in the drawings is for illustrative purposes only and it is to be expressly understood that said drawings and the accompanying specification are not to be construed as a definition of the limits or scope of the invention reference being had to the appended claims for that purpose.

I claim:

1. An electromagnetic operator comprising a first magnetic frame having an externally directed pole face, a second magnetic frame having a portion spaced externally from said pole face to form an air gap therebetween, a winding on said first magnetic frame which when energized is adapted to produce magnetic flux in said frame and across said air gap, and an armature of loop form encircling both said first magnetic frame and said winding and comprising torque arms mounted for turning movement about an axis and extending generally transversely with respect to said axis out beyond the outer periphery of said first magnetic frame and beyond said winding on said frame, said torque arms being provided at their outer ends with an armature arm operable in said air gap and externally of said pole face to impart turning movement to said armature in one direction by magnetic flux produced across said air gap by energization of said winding.

2. An electromagnetic operator comprising a first magnetic frame having an externally directed pole face, a second magnetic frame having a portion spaced externally from said pole face to form an air gap therebetween, a winding on said first magnetic frame which when energized is adapted to produce magnetic flux in said frame and across said air gap, an armature of loop form encircling both said first magnetic frame and said winding and comprising torque arms mounted for turning movement about an axis and extending generally transversely with respect to said axis out beyond the outer periphery of said first magnetic frame and beyond said winding on said frame, said torque arms being provided at their outer ends with an armature arm operable in said air gap and externally of said pole face to impart turning movement to said armature in one direction by magnetic flux produced across said air gap by energization of said winding, an actuated member to be actuated by said armature, and means connected to at least one of said torque arms between said axis of turning movement and the outer end of said torque arm for transmitting turning movement imparted to said armature to said actuated member to actuate same from one position to another position.

3. An electromagnetic operator comprising a first magnetic frame having an externally directed arcuate pole face, a second magnetic frame having a portion spaced externally from said pole face to form an air gap therebetween, a winding on said first magnetic frame which when energized is adapted to produce magnetic flux in said frame and across said air gap, and an armature of loop form encircling both said first magnetic frame and said winding and comprising torque arms mounted for turning movement about an axis and extending generally transversely with respect to said axis out beyond the outer periphery of said first magnetic frame and beyond said winding on said frame, said torque arms being provided at their outer ends with an armature arm of arcuate form in transverse section and operable in said air gap and externally of said pole face to impart turning movement to said armature in one direction by magnetic flux produced across said air gap by energization of said winding.

4. An electromagnetic operator comprising a first magnetic frame having a pair of pole faces directed externally in opposite directions, a second magnetic frame having portions spaced externally from said pole faces to form air gaps therebetween, a winding on said first magnetic frame which when energized is adapted to produce magnetic flux in said frame and across said air gaps, and an armature in the form of a loop encircling both said first magnetic frame and said winding and comprising torque arms mounted for turning movement about an axis located between said pole faces and extending generally transversely with respect to said axis and out beyond the outer periphery of said first magnetic frame and beyond said winding on said frame, each of the opposite ends of said armature portion being provided with an armature arm affording a current conducting path of closed circuit looped form operable in said air gaps and externally of each pole piece to impart turning movement to said armature in one direction by magnetic flux produced across said air gaps by energization of said winding.

5. An electromagnet operator comprising a first magnetic frame having an externally directed pole face, a second magnetic frame having a portion spaced externally from said pole face to form an air gap therebetween, a winding on said first magnetic frame which when energized is adapted to produce magnetic flux in said frame and across said air gap, an armature in the form of a loop encircling both said first magnetic frame and said winding and comprising torque arms, mounted for turning movement about an axis and extending generally transversely with respect to said axis and out beyond the outer periphery of said first magnetic frame and beyond said winding on said frame, said armature portion being provided at its outer end with an armature arm affording a current conducting path of closed circuit looped form operable in said air gap and externally of said pole face to impart turning movement to said armature in one direction by magnetic flux produced across said air gap by energization of said winding, and biasing means biasing said armature in the opposite direction and effective when no flux is present in said air gap to position said armature arm where it will be acted upon by magnetic flux across said air gap to impart turning movement to said armature in said one direction.

6. An electromagnetic operator comprising an armature in the form of a loop and having a pair of spaced torque arms mounted for turning movement about an axis, a first magnetic frame positioned between said torque arms and having an externally directed pole face, a second magnetic frame having a portion spaced externally from said pole face to form an air gap therebetween, a winding on said first magnetic frame which when energized is adapted to produce magnetic flux in said frame and across said air gap, said first magnetic frame and said winding each being located within the loop formation of said armature, said armature having an armature arm carried by the outer end of said torque arms and disposed externally of said first magnetic frame and said winding, said armature arm being operable in said air gap so as to impart turning movement to said armature in one direction by magnetic flux across said air gap, and biasing means biasing said armature in the opposite direction and effective when no flux is present in said air gap to position said armature arm where it will be acted upon by magnetic flux across said air gap to impart turning movement to said armature in said one direction.

7. An electromagnetic operator comprising an armature in the form of a loop and having a pair of spaced torque arms, a first magnetic frame positioned between said torque arms and having a pair of pole faces directed externally in opposite directions, a second magnetic frame having portions spaced externally from said pole faces to form a pair of air gaps therebetween, a winding on said first magnetic frame which when energized is adapted to produce magnetic flux in said frame and across said air gaps, said first magnetic frame and said winding each being located within the loop formation of said armature, said torque arms being mounted for turning movement about an axis located between said pole faces and having armature arms carried by the opposite outer ends thereof and disposed externally of said first magnetic frame and said winding, said armature arms being operable in said air gaps so as to impart turning movement to said armature in one direction by magnetic flux across said air gaps, the force afforded by said armature arms being additive thereby affording increased force for the operator for a given value of flux density, and biasing means biasing said armature in the opposite direction and effective when no flux is present in said air gaps to position said armature arms where they will be acted upon by magnetic flux across said air gaps to impart turning movement to said armature in said one direction.

8. An electromagnetic operator comprising an armature in the form of a loop and having a pair of spaced torque arms, a first magnetic frame positioned between said torque arms and having a pair of pole faces directed externally in opposite directions, a second magnetic frame having portions spaced externally from said pole faces to form a pair of air gaps therebetween, a winding on said first magnetic frame which when energized is adapted to produce magnetic flux in said frame and across said air gaps, said first magnetic frame and said winding each being located within the loop formation of said armature, said torque arms being mounted for turning movement about an axis located between said pole faces and having armature arms carried by the opposite outer ends thereof and disposed externally of said first magnetic frame and said winding, said armature arms being operable in said air gaps so as to impart turning movement to said armature in one direction by magnetic flux across said air gaps, the force afforded by said armature arms being additive thereby affording increased force for the operator for a given value of flux density, an actuated member to be actuated by said operator, means for transmitting turning movement imparted to said armature by magnetic flux across said air gaps to said actuated member to actuate same from a first position to a second position, and biasing means biasing said armature in the opposite direction and effective when no flux is present in said air gaps to position said actuated member in its first position and said armature arms where they will be acted upon by magnetic flux across said air gaps to impart turning movement to said armature in said one direction.

9. An electromagnetic operator comprising an armature having a pair of spaced armature portions, a first magnetic frame positioned between said armature portions and having a pair of pole faces directed externally in opposite directions, a second magnetic frame having portions spaced externally from said pole faces to form a pair of air gaps therebetween, a winding on said first magnetic frame which when energized is adapted to produce magnetic flux in said frame and across said air gaps, said armature portions being mounted for turning movement about an axis located between said pole faces and having armature arms carried by the opposite outer ends thereof and disposed externally of said first magnetic frame, said armature arms being operable in said air gaps so as to impart turning movement to said armature in one direction by magnetic flux across said air gaps, the force afforded by said armature arms being additive thereby affording increased force for the operator for a given value of flux density, an actuated member to be actuated by said operator, means for transmitting turning movement imparted to said armature by magnetic flux across said air gaps to said actuated member to actuate same from a first position to a second position, and biasing means biasing said armature in the opposite direction and effective when no flux is present in said air gaps to position said actuated member in its first position and said armature arms where they will be acted upon by magnetic flux across said air gaps to impart turning movement to said armature in said one direction; said means for transmitting turning movement to said actuated member comprising a shaft carrying said actuated member, a cam arm non-rotatably connected to said shaft, and cam means carried by said armature and coacting with said cam arm for actuating said actuated member from its first position to its second position by the turning movement imparted to said armature by magnetic flux across said air gaps.

10. In a device of the class described, in combination, an electromagnetic operator comprising an armature having a pair of spaced armature portions, a first magnetic frame positioned between said armature portions and having a pair of pole faces directed externally in opposite directions, a second magnetic frame having portions spaced externally from said pole faces to form a pair of air gaps therebetween, a winding on said first magnetic frame which when energized is adapted to produce magnetic flux in said frame and across said air gaps, said armature portions being mounted for turning movement about an axis located between said pole faces and having armature arms carried by the opposite outer ends thereof and disposed externally of said first magnetic frame, said armature arms being operable in said air gaps so as to impart turning movement to said armature in one direction by magnetic flux across said air gaps, the force afforded by said armature arms being additive thereby affording increased force for the operator for a given value of flux density, a shaft mounted for turning movement in said second magnetic frame, an actuated member carried by said shaft for swinging movement with turning movement of said shaft, a cam arm non-rotatably connected to said shaft, cam means carried by said armature and coacting with said cam arm for actuating said actuated member from a first position to a second position by turning movement imparted to said armature by magnetic flux across said air gaps, and biasing means biasing said armature and said actuated member in the opposite direction and effective when no magnetic flux is present in said air gaps to position said actuated member in its said first position and said armature arms where they will be acted upon by magnetic flux across said air gaps to impart turning movement to said armature in said one direction with accompanying swinging movement of said actuated member to its said second position.

11. An electromagnetic operator comprising an armature in the form of a loop and having a pair of spaced torque arms mounted for turning movement about an axis, a magnetic frame positioned between said torque arms and having an externally directed pole face, a winding on said frame which when energized is adapted to produce magnetic flux in said frame, said magnetic frame and said winding being located within the loop formation of said armature, and an armature arm connected between outer ends of said torque arms and adapted for swinging movement around the outer periphery of the pole face of said magnetic frame by magnetic flux produced in said frame by energization of said winding.

12. An electromagnetic operator comprising a magnetic frame having a base provided with a pair of arms, first bracket means supporting a second magnetic frame having a pair of pole faces directed externally in opposite directions and spaced from said arms to form a pair of air gaps therebetween, said first bracket means being located on one side of said second magnetic frame, a winding on said second magnetic frame which when energized is adapted to produce magnetic flux in said frame and across said air gaps, second bracket means o nthe opposite side of said second magnetic frame, an armature having a pair of armature portions on opposite sides of said second magnetic frame and mounted for turning movement on said first and second bracket means, and armature arms connected between outer ends of said armature portions and operable in said air gaps so as to impart turning movement to said armature by magnetic flux across said air gaps.

13. An electromagnetic operator comprising a first magnetic frame having an externally directed pole face, a second magnetic frame having a frame portion spaced externally from said pole face to form an air gap therebetween, a winding on said first magnetic frame which when energized is adapted to produce magnetic flux in said first magnetic frame and across said air gap, and an armature of loop form encircling both said first magnetic frame and said winding and mounted for turning movement about an axis and having an armature arm disposed externally of said first magnetic frame and said winding and operable in said air gap, said armature arm having a current conducting path of closed circuit looped form through which current induced by the supply of electric energy to said winding is adapted to flow for reaction with the magnetic flux across said air gap to impart turning movement to said armature.

14. An electromagnetic operator comprising an armature having a pair of spaced armature portions, a first magnetic frame positioned between said armature portions and having a pair of pole faces directed externally in opposite directions, a second magnetic frame having portions spaced externally from said pole faces to form a pair of air gaps therebetween, a winding on said first magnetic frame which when energized is adapted to produce magnetic flux in said frame and across said air gaps, said armature portions being mounted for turning movement about an axis located between said pole faces and having armature arms carried by the outer ends thereof and disposed externally of said first magnetic frame, said armature arms being operable in said air gaps so as to impart turning movement to said armature in one direction by magnetic flux across said air gaps, the force afforded by said armature arms being additive thereby affording increased force for the operator for a given value of flux density, and biasing means biasing said armature in the opposite direction and effective when no flux is present in said air gaps to position said armature arms where they will be acted upon by magnetic flux across said air gaps to impart turning movement to said armature in said one direction, said armature arms each having a current conducting path of closed circuit looped form through which current induced by the supply of electric energy to said winding is adapted to flow for reaction with the magnetic flux across said air gaps to impart turning movement to said armature.

15. An electromagnetic operator according to claim 14 wherein there are magnetic inserts located within the looped conducting paths in said armature arms and within the air gaps between said pole faces and the magnetic frame portions of said second magnetic frame.

16. An electromagnetic operator comprising a rotary armature in the form of a loop, and a power unit including a magnetic frame having a pole face defining the inner side of an air gap and a winding, said magnetic frame and said winding each being located within said loop, said winding when energized being adapted to produce magnetic flux in said frame and across said air gap, said loop affording a current conducting path of closed circuit looped form in coacting relation with respect to said air gap and through which current induced by the energization of said winding is adapted to flow for reaction with said magnetic flux across said air gap to impart turning movement to said armature.

References Cited in the file of this patent
UNITED STATES PATENTS

| | | |
|---|---|---|
| 390,802 | Patten | Oct. 9, 1888 |
| 1,644,171 | Caldwell | Oct. 4, 1927 |
| 2,013,836 | Parsons | Sept. 10, 1935 |
| 2,110,313 | Warrick | Mar. 8, 1938 |
| 2,273,317 | Hansen | Feb. 17, 1942 |
| 2,508,380 | Freedman | May 23, 1950 |

FOREIGN PATENTS

| | | |
|---|---|---|
| 674,866 | France | Oct. 28, 1929 |